Patented Dec. 19, 1950

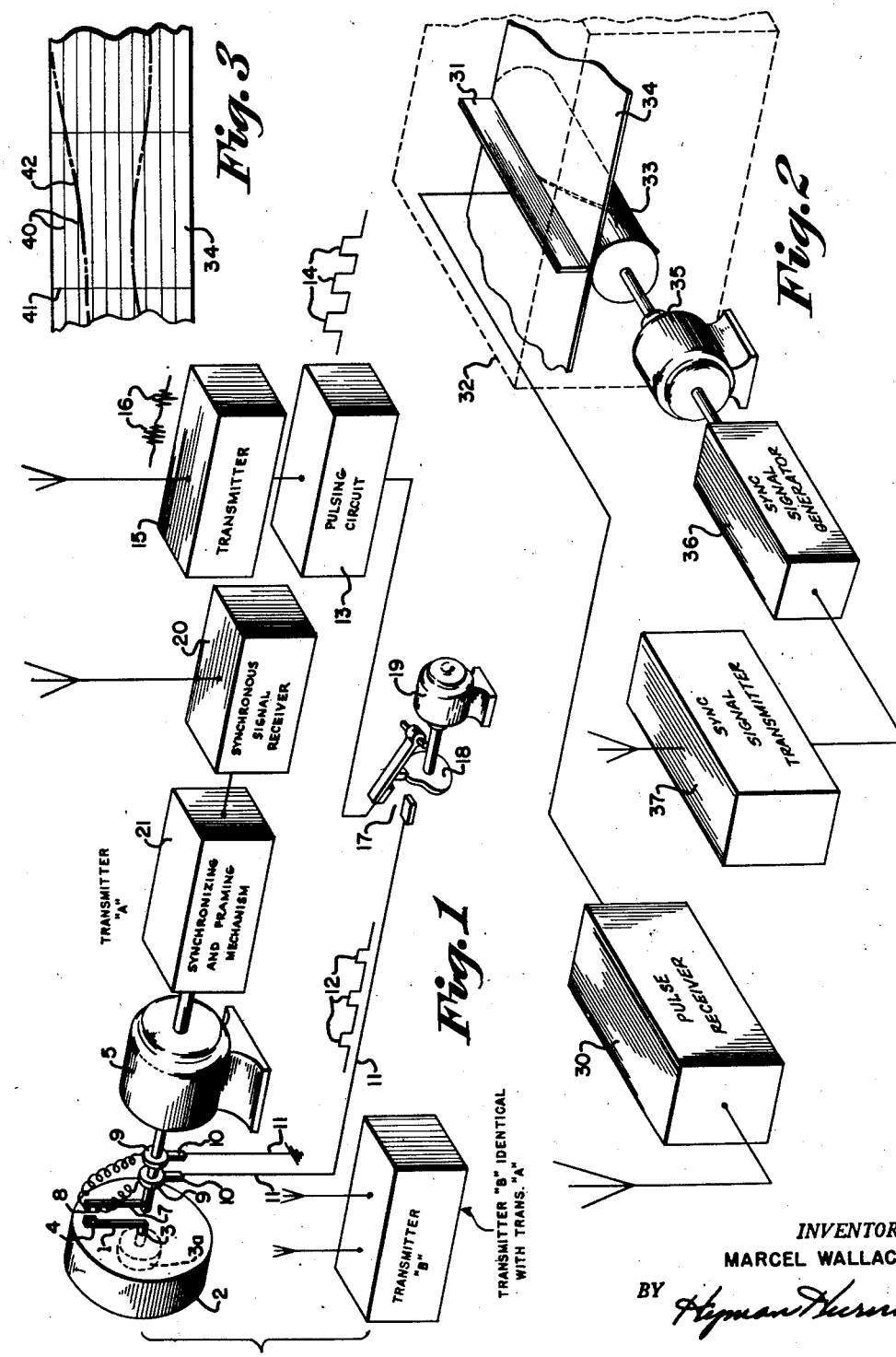

2,534,841

UNITED STATES PATENT OFFICE 2,534,841

TELEMETRIC PULSE TIME POSITION RECORDER

Marcel Wallace, Port Chester, Conn., assignor of one-half to Panoramic Radio Corporation, Mount Vernon, N. Y., a corporation of New York Application April 25, 1947, Serial No. 743,939

8 Claims. (Cl. 346—33)

This invention relates generally to telemetric systems and methods, and more particularly to telemetric recording systems and methods for transmitting the readings of a plurality of instruments to a remote point, and there recording same.

The copending application for Letters Patent of the United States, Serial No. 633,138, filed in the name of M. Wallace and W. Ieu-Liang Wu, on Dec. 6, 1945, now Patent #2,505,314, issued April 25, 1950, relates to indicating devices of a telemetric nature, and which utilize pulse time position modulations to convey telemetric information. The present application likewise utilizes time positioning of transmitted pulses as a mode of conveying information concerning the values of measurable quantities; but provides apparatus for recording the time position values of the transmitted pulses, a plurality of values being recorded on a common record receiving surface.

It is a primary object of the present invention to provide a system and a method of recording at a remote location the instantaneous values of a plurality of measurable quantities, the said values being transmitted in terms of the time positions of transmitted pulses.

It is a further object of the invention to provide a system and method of recording telemetrically at a remote location the instantaneous readings of a plurality of instruments.

It is still a further object of the present invention to provide a telemetric system and method for translating the reading of a measuring instrument into a time position of a transmitted pulse, and for retranslating the time position of the transmitted pulse into the spatial position of a recorded mark.

More broadly stated, it is an object of the present invention to provide a method and a system for translating spatial positions of mechanical elements into time positions of transmitted signals, and for retranslating the time positions of the transmitted signals into spatial positions of recorded marks.

Stated more specifically, it is an object of the present invention to scan the range of possible spatial positions of a positionable mechanical element, which represents in terms of its position the value of a measurable quantity, and to generate a pulse of energy at time positions corresponding with the instantaneous spatial position of the positionable element; and to provide a recording station wherein a mechanical marking element scans a time-fed record receiving surface spatially, in synchronism with the first mentioned scanning, the marking element being constrained to produce a mark on said record receiving surface in response to application to said marking element of transmitted pulses.

It is still a further object of the present invention to provide, in systems of the character above referred to, mechanisms for modulating the pulse transmissions, and consequently the recordings of values of measured quantities, in accordance with the identities of the quantities, to enable discrimination between individual records, and identification thereof.

The above and still further objects, features and advantages of the invention will become apparent upon study of the following detailed description of an embodiment of the invention, especially when taken in conjunction with the appended drawings, wherein:

Figure 1 illustrates the mechanical and electrical features of a transmitter arranged, in accordance with the invention, for transmitting pulses having time positions determined by the value of a measurable quantity, and a conventionalized view of a second transmitter;

Figure 2 illustrates the mechanical and electrical features of a receiver and recorder for receiving pulses transmitted by a plurality of stations of the character illustrated in Figure 1 of the drawings, and for translating said pulses into markings representative of the values of measurable quantities; and Figure 3 is a plan view of a record receiving surface having thereon recordings produced by the recorder of Figure 2 of the drawings, and indicating the character of the recordings and of the identifying modulations impressed thereon.

Referring now to the drawings, the reference numeral 1 denotes the pointer of a measuring instrument 2 capable of measuring the value of a measurable quantity, such as altitude, velocity, pressure, range, direction, acceleration, force, or the like. The present invention is broadly applicable to the measurement of any type of quantity, and no limitation is intended by the recitation of the above specifically recited quantities, which are intended to be exemplary merely of possible applications of the invention. The pointer 1 is rotatable on a pivot 3, which may be moved, by means of mechanism 3a which is not illustrated in detail, and the specific character of which forms no part of the invention, but is determined by the character of the quantity being measured, to assume an angular position representative of the value of a measurable quantity.

Secured to the pointer 1 at any convenient point thereof is a small, light permanent magnet 4. The mode of securing the magnet 4 to the pointer 1, and the location on the pointer to which the magnet may be secured, involves a matter of choice for the mechanical designer. I have found, in practice, that the magnet 4 may be satisfactorily secured to the pointer 1 by means of a drop of adhesive material, and that the location which is to be preferred is that adjacent the extremity of the pointer, which provides maximum accuracy of pulse timing.

A synchronous motor 5 is positioned with its shaft 6 in colinear alignment with the pivot 3. Secured to the shaft 6 by means of a radial arm 7 is a pick-up coil 8, the terminals of which are connected to a pair of slip-rings mounted on the shaft 6. A stationary brush 10 is associated with each of the slip-rings 9, in electrical contact therewith, and to the brushes are connected leads 11 to enable derivation of voltages which may be induced in the coil 8.

The locus of travel of the pickup coil 8 is arranged to be parallel and adjacent to the locus of positions which may be assumed by the magnet 4. It will accordingly be evident that, as the shaft 6 is rotated by the synchronous motor 5, a pulse of voltage will be induced in the coil 8 at each precise instant of passage of the coil 8 through the position occupied by the magnet 4, and hence by the pointer 1, and that continued rotation of the motor 5 will cause repetitive, periodic pulse generation, the pulses being spaced by equal increments of time, but the time position of the pulses with respect to an arbitrary zero of time being determined by the spatial position of the pointer 1.

Voltage pulses 12 impressed on the leads 11 upon passage of pick-up coil 8 adjacent the permanent magnet 4 are impressed on a pulsing circuit 13, which in turn provides powerful keying pulses 14 to the radio transmitter 15, the latter emitting, in response to each keying pulse 14, a pulse of radio frequency energy 16, at a fixed frequency, for transmission to and reception at a remote location.

The present invention envisages the utilization of a plurality of transmitting stations of the character of that illustrated as transmitter A in Figure 1 of the drawings, one of these being illustrated schematically as transmitter B, and the translation and recording of transmissions from the plurality of transmitting stations in a single recorder. It is necessary, accordingly, to provide means for identifying individual transmissions, and also for synchronizing and framing the various transmitters to assure that each shall transmit signal pulses timed with respect to a common arbitrary zero of time.

The identification function is most simply accomplished by means of a mechanical switch 17, inserted in series with one of the lines 11, between brushes 10 and pulsing circuits 12, the line 11 being opened and closed in coded rhythm by means of a cam 18, having a circumference cut in accordance with an identifying code of any desired character, which is individual to the transmitter, the cam 18 being rotated slowly by means of a small drive motor or clock 19. Opening of switch 17 totally prevents transmission of signals 16.

Synchronization and framing of the synchronous motor 5 may be accomplished in accordance with any of the conventional systems for accomplishing this function, a sync signal receiver 20 being provided at each telemetric transmitter which receives synchronizing signals emanating, preferably, from a sync signal generator located at the recording station, and applies the sync signal to a synchronizing and framing mechanism 21 located on the shaft of motor 5 or built into the motor 5.

While the specific character of the synchronizing and framing system which may be utilized in the practical application of my invention involves merely a matter of choice, a wide variety of such systems being known to the electrical arts, and particularly to the art of facsimile reception, with respect to which my invention bears certain analogy, I specify one preferred system of synchronization for use in the present telemetric system, namely, that described and illustrated in Letters Patent of the United States No. 2,263,641, issued to Nicolson.

Referring now to Figure 2 of the drawings, which illustrates a signal receiving, translating and recording apparatus arranged in accordance with the present invention, the reference numeral 30 denotes a receiver arranged to receive and demodulate pulse signals of the character of those identified by the reference numeral 16 in Figure 1 of the drawings, and which are provided by the various transmitters 15 of the system. Detected pulses provided by the receiver 30 are applied to the marker arm 31 of a facsimile type recorder 32, having a helical platen 33, and a time-fed record receiving surface 34. The specific structure of the recorder 32 forms no part of the present invention, and I may utilize various recorders of the type indicated, such recorders being available for purchase commercially and having been the subject of a large number of Letters Patent of the United States. I specify, however, that a recorder of the type disclosed in United States Patent No. 2,215,806, issued to C. J. Young, and dated Sept. 24, 1940, is satisfactory for the purpose in hand, and make reference to that patent for a full and complete disclosure of a suitable recording mechanism. Suffice it to state in the present specification, that marks are created on the record receiving surface 34 upon application to the marker arm 31 of a sufficient voltage, the lateral position of the mark being determined by the instantaneous position of the helical platen at the instant of application of the said voltage. The platen 33 of the recorder 32 is rotated by means of a synchronous motor 35 at the same speed and with the same framing phase as are the various synchronous motors 5, located at the telemetric transmitters of the system, and which cause rotation of pulse generating pick-up coils 8. In order to assure that the synchronous motor 35 and the various synchronous motors 5 shall be synchronized and identically framed, the motor 35 is utilized to control a sync signal generator 36, which supplies its output to a radio transmitter 37 tuned to transmit on the frequency to which are tuned the various sync signal receivers 20, located at the telemetric transmitting stations of the system. The specific structure and mode of operation of the sync signal generating equipment provided at the receiving and recording station of the present system forms no part of the invention, it being sufficient that signals be provided which are of suitable character to cooperate with the synchronizing and framing equipment at the various telemetric transmitters, to assure that the motors 5 will maintain precise framing and synchronization with the motor

35. Many such synchronizing and framing systems are available in the prior art, and I do not desire to be restricted to any particular one of such systems. I have, however, specified one specific system which I prefer to employ, a full description of which, both in respect to structure and mode of operation, is to be found in Letters Patent of the United States, No. 2,263,641, to Nicolson, reference to which has been made hereinbefore in connection with the description of telemetric transmitter synchronization.

By virtue of the identical framing and rotative speed of the recorder motor 35 and of the telemetric transmitter motors 5, a common zero of time may be provided for all the equipments of the present system, and the coil supporting arms 8 as well as the helical platen 33 may be so arranged that upon passage of the coils 8 adjacent a meter position corresponding with zero value of the measured quantity, or of zero angular displacement of the meter pointer 1, the helical platen 33 shall be so phased as to be potentially able to create a mark on the record receiving surface 34 at a point corresponding with a zero calibration line antecedently provided on the surface. The record receiving surface may be calibrated laterally, by means of laterally spaced parallel lines 40 provided thereon (see Figure 3), to enable determination of the value of any mark created on the paper. The total lateral dimension of the record receiving surface 34, or any predetermined portion thereof, may be caused to correspond with the total possible angular displacement of the meter pointer 1. Time calibration 41 may further be provided on the record receiving surface 34, so that the values of recorded values may be determined for times in the past.

The recorded values will appear as lines 42 on the surface 34, each of which will be interrupted in a different coded sequence, to enable identification of the separate recordings, and to enable coordination of recordings with specific telemetric transmitters.

While I have illustrated my invention applied to a telemetric system which transmits signals as radiant energy, it will be obvious to those skilled in the pertinent art that transmission may take place over wires, or over transmission line, and that either high or low frequency signals may be employed, or if desired direct current signals may be employed, these matters lying within the field of choice of engineering personnel.

The system may be adapted for use to transmit information of navigational or other significance from a plurality of aircraft to a central recording station, or it may be adapted to transmit information concerning meter readings from a bank of proximately located meters to a remote recorder, and many other uses thereof are envisaged, or will suggest themselves, as the need arises.

While I have described and illustrated one preferred and specific embodiment of the invention, it is clear that various modifications of the system and method may be resorted to, both in respect to the combination of elements and in respect to details of arrangement and construction, without departing from the spirit and true scope of the invention as defined in the appended claims.

What I claim and desire to secure by Letters Patent of the United States is:

1. In combination, a plurality of stations, each of said stations comprising an element positionable over a range of positions means for simultaneously and synchronously scanning said elements over said range of positions at all said stations and means responsive to substantial coincidence of said element and of said means for scanning at each station for generating a signal, remote means for recording said signals from said plurality of stations comprising, a record receiving surface and a marker for making marks on said record receiving surface, means for actuating said marker to scan across said record receiving surface in identical synchronism simultaneously with the scanning of each of said means for scanning a range of positions, means responsive to said signals for actuating said marker to make marks on said record receiving surface in positions representative with respect to a common zero base line of the positions of said elements positionable over a range of positions, and means for commonly synchronizing and phasing said means for actuating said marker to scan across said record receiving surface and each of said plurality of means for scanning said range of positions.

2. In combination, a plurality of distinct and mutually space separated pulse generating means, means responsive to each of a plurality of measured values for determining time positions of pulses generated by different ones of said plurality of distinct pulse generating means, a single recorder having a record receiving surface and a line scanning marking means for scanning periodically across said record receiving surface in successive lines, means for energizing said line scanning marking means to mark during said line scanning at times corresponding with respect to a common zero of time with the time positions of said pulses, and means for commonly synchronizing said plurality of pulse generating means and said line scanning marking means.

3. In combination, a plurality of stations, each of said stations comprising means for determining a significant spatial position, means at all of said stations for simultaneously periodically and synchronously scanning a range of spatial positions including said significant spatial position, means at each of said stations responsive to said means for scanning for generating pulses at times representative with respect to a common zero of time of said significant spatial positions, a remote recorder comprising a record receiving surface and a marker, means for actuating said marker to scan periodically across said record receiving surface, means for commonly synchronizing said means for periodically scanning at each of said stations with said means for actuating said marker to scan periodically across said record receiving surface, and means responsive to pulses generated by said pulse generating means at said plurality of stations for energizing said marker to make marks on said record receiving surface.

4. In combination, means for periodically generating groups of pulses, each of said pulses of each group of pulses being phased with respect to a common zero phase in accordance with a different variable value, a recorder comprising marking means and a record receiving surface, means for driving said marking means in space scanning motion across said record receiving surface, means for synchronizing and commonly phasing with respect to said common zero phase the scanning operation of said marking means and the operation of all said means for periodically generating pulses, means for detecting said pulses and applying said pulses to said marking means, said marking means comprising means responsive to said pulses for producing a record on said record receiving surface.

5. In combination, first cyclic space scanning means, second cyclic space scanning means, third cyclic space scanning means, means for synchronizing and commonly phasing the scanning of said first, second and third scanning means, means responsive to said first scanning means for generating signals phased with respect to a zero of time in accordance with a first variable value, means responsive to said second scanning means for generating signals phased with respect to said zero of time in accordance with a second variable value, and means comprising said third cyclic space scanning means for recording the phasing of said signals in terms of spatial positions of recorded values with respect to a common zero base line.

6. In combination, a plurality of means for measuring, a corresponding plurality of angularly positionable members each associated with a different one of said means for measuring, means for translating measurements made by each of said means for measuring into an angular position of its associated angularly positionable means, means for periodically scanning in common synchronism and phase the total range of angular position of all said angularly positionable members with respect to a common zero position, means for providing periodic signals each timed with respect to a common zero time in dependence upon one of said angular positions, a normally inoperative to record recorder comprising a marker, a record receiving surface, and means for actuating said marker in scanning relation periodically across said record receiving surface in synchronism with all said means for periodically scanning, a receiver for said periodic signals, and means responsive to reception of said periodic signals by said receiver for causing a recording operation of said recorder.

7. In combination, a plurality of meters having each a pointer movable in a predetermined path, scanning devices each associated with one of said meters for simultaneously periodically and synchronously scanning said paths, means responsive to substantial coincidence of each of said pointers and of its associated scanning device for generating a pulse timed in accordance with the position of said pointer, means including radio transmitters for transmitting said pulses, a single remotely located pulse receiving and recording means, said recording means comprising a time-fed record receiving surface moving in a first predetermined direction and a scanning marking means for scanning said surface at an angle to said predetermined direction, means for synchronizing and commonly phasing the scanning action of said plurality of scanning devices and of said scanning marking means, and means responsive to receipt of each pulse by said pulse receiving and recording means for actuating said recording means to make a mark on said record receiving surface.

8. In combination, a plurality of pulsed radio frequency transmitters, an angularly positionable element associated with each of said transmitters, means for generating periodic pulses at each of said transmitters with respect to a common zero time in accordance with the angular position at said each of said transmitters of the angularly positionable element associated therewith, means for applying said periodic pulses to said transmitters, means responsive to said pulses for causing said transmitters to transmit pulsed radio frequency signals, a single recorder comprising a record receiving surface and a marker, means responsive to said pulsed radio frequency signals for controlling said recorder to record, means for actuating said marker periodically across said record receiving surface, and means responsive to motion of said marker periodically across said record receiving surface for synchronizing said plurality of means for generating periodic pulses.

MARCEL WALLACE.

REFERENCES CITED

The following references are of record in the file of this patent:

UNITED STATES PATENTS

| Number | Name | Date |
|--------|------|------|
| 2,125,491 | Dean | Aug. 2, 1938 |
| 2,139,103 | Vanderhider | Dec. 6, 1938 |
| 2,321,971 | Becker | June 15, 1943 |
| 2,403,890 | Johnson | July 9, 1946 |
| 2,411,494 | Bliss | Nov. 19, 1946 |
| 2,437,242 | Cole et al. | Mar. 9, 1948 |